(12) United States Patent
Yang et al.

(10) Patent No.: US 7,042,606 B2
(45) Date of Patent: May 9, 2006

(54) LIGHT MODULATOR TYPE MULTI-BEAM SCANNING APPARATUS USING DICHROIC SLIT

(75) Inventors: Haeng-Seok Yang, Kyunggi-do (KR); Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 10/952,378

(22) Filed: Sep. 28, 2004

(65) Prior Publication Data

US 2006/0039053 A1   Feb. 23, 2006

(30) Foreign Application Priority Data

Aug. 19, 2004  (KR) ................. 10-2004-0065496

(51) Int. Cl.
*G02B 26/08* (2006.01)

(52) U.S. Cl. .................................... 359/204

(58) Field of Classification Search ............. 359/201, 359/202, 204, 618, 629, 638, 558, 559
See application file for complete search history.

(56) References Cited

U.S. PATENT DOCUMENTS 6,798,575 B1 * 9/2004 Kobayashi ............. 359/202

\* cited by examiner

*Primary Examiner*—Euncha P. Cherry
(74) *Attorney, Agent, or Firm*—Christensen O'Connor Johnson Kindness PLLC

(57) ABSTRACT

Disclosed herein is a light modulator type multi-beam scanning apparatus using a dichroic slit. The scanning apparatus includes a first lens unit, a plurality of light modulators, a focusing unit, a second lens unit and a third lens unit. The first lens unit converts a plurality of beams of light into collimated beams, respectively, and outputs the collimated beams. The light modulators modulate the collimated beams into diffracted beams having a plurality of diffraction orders. The focusing unit forms a multi-diffracted beam by focusing the diffracted beams having the plurality of diffraction orders. The second lens unit separates the multi-diffracted beam into separate diffracted beams according to diffraction orders. The dichroic slit selectively transmits some of the separate diffracted beams having one or more predetermined diffraction orders. The third lens unit projects the sum of the separate beams onto an object.

13 Claims, 8 Drawing Sheets

LIGHT MODULATOR TYPE MULTI-BEAM SCANNING APPARATUS USING DICHROIC SLIT

BACKGROUND OF THE INVENTION

1. Field of the Invention

The present invention relates generally to a light modulator type multi-beam scanning apparatus and, more particularly, to a light modulator type multi-beam scanning apparatus using a dichroic slit, in which each of the transmissive portions of the dichroic slit, which corresponds to light of a specific color, is coated with a material capable of transmitting only light of the specific color so as to filter light of various colors using a single slit.

2. Description of the Related Art

A light beam scanning apparatus is an apparatus that focuses an image by scanning a light beam and spotting the light beam on a photosensitive medium in an image producing apparatus, such as a laser printer, a display device, a Light Emitting Diode (LED) printer, an electronic photocopier or a word processor.

As image producing apparatuses have trended toward small size, high speed and high resolution, light beam scanning apparatuses have continuously been developed to have small size, high speed and high resolution characteristics correspondingly.

Light beam scanning apparatuses for image producing apparatuses may be classified into a laser scanning type using an f·θ lens and an image head printer type according to a light beam scanning method and the construction of a light beam scanning apparatus.

FIG. 1 is a perspective view showing a conventional scanning apparatus using a single light sources and an f·θ lens.

As shown in FIG. 1, the conventional laser scanning apparatus includes a Laser Diode (LD) 10 for emitting a light beam in response to a video signal, a collimator lens 11 for converting the light beam, emitted from the LD 10, into collimated light, a cylinder lens 12 for converting the collimated light, having passed through the collimator lens 11, into linear light parallel to a scanning direction, a polygon mirror 13 for scanning the linear light, having passed through the cylinder lens 12, by moving the linear light at a constant linear velocity, a polygon mirror drive motor 14 for rotating the polygon mirror 13 at a constant velocity, an f·θ lens 15 having a constant refractive index with respect to a light axis and focusing constant angular velocity light by deflecting the constant angular velocity light, reflected by the polygon mirror 13, toward a main scanning direction and correcting aberration, a reflecting mirror 16 for forming an image on the surface of a photosensitive drum 17 by reflecting the light beam, transmitted through the f·θ lens 15, toward a predetermined direction, a horizontal synchronization mirror 18 for reflecting the light beam, transmitted through the f·θ lens 15, toward a horizontal direction, and a light sensor 19 for receiving the light beam, reflected by the horizontal synchronization mirror 18, and performing synchronization on the light beam.

The laser scanning type light beam scanning apparatus is problematic in that it is difficult to achieve high-speed printing due to the low switching speed of the LD 10 and the scanning speed of the polygon mirror 13.

Meanwhile, to increase the speed at which the light beam is scanned, the polygon mirror 13 must be rotated using a high-speed motor. In this case, the high-speed motor is costly, and deteriorates the operational reliability of the laser scanning apparatus by generating heat, vibration and noise, so that it is difficult to increase the scanning speed by employing the high-speed motor.

Another method of increasing the speed of the light beam scanning apparatus is an image head printing method using a multi-beam producing apparatus.

A multi-beam scanning apparatus has a plurality of light emitting units (laser heads). The multi-beam scanning apparatus simultaneously and optically scans a plurality of light beams, emitted from the plurality of light emitting units, onto the surface of a storage medium in the form of a plurality of light spots in such a way as to image the plurality of light beams, transmitted through a light reflector, using an imaging lens.

Although the number of times per unit time that a single light spot is optically scanned onto the surface of the storage medium must be considerably increased to achieve high-speed printing using the single light spot, the rotational speed of the light reflector and an image clock cannot meet that high number of times per unit time. Consequently, when the number of beam spots increases, the rotational speed of the light reflector and the image clock is in reverse proportion to the increase in the number of beam spots.

To effectively form a plurality of beam spots, a laser element functioning as a light source can have a plurality of light emitting points (light emitting units) that can be independently operated.

Such a laser element having a plurality of light emitting points is generally referred to as a "monolithic multi-beam laser element." When the monolithic multi-beam laser element is used, various optical elements arranged behind the light source can be generally used in conjunction with a plurality of light beams, so that the monolithic multi-beam laser element provides great advantages in cost, work efficiency and adjustment.

FIG. 2 is a diagram showing a conventional image head printing method for performing laser scanning using a multi-beam formed by an LED array constructed in an image head.

Referring to FIG. 2, by constructing an LED array 21, in which the number of LEDs 22 is so large that the LEDs 22 can fill a printing paper, in an image head 20, the conventional image head printing method can print one line at one time without the use of a polygon mirror and an f·θ lens, unlike the laser scanning method, thus increasing printing speed considerably.

Such a monolithic multi-beam laser element includes, for example, a so-called surface emitting laser (surface emitting semiconductor laser).

A surface emitting laser emits a light beam in the direction parallel to the transverse direction of a silicon layer, whereas a conventional semiconductor laser emits a light beam in the direction vertical to the transverse direction of the silicon layer.

The surface emitting laser has the following characteristics.

The conventional semiconductor laser emits light having an elliptical cross section and various divergence angles, whereas the surface emitting laser can emit a circular beam having a stable divergence angle.

However, the surface emitting laser is problematic in that its output light beam has an unstable polarization direction. Even though the polarization direction can be somewhat controlled by a manufacturing process, it varies with a light emitting point, a surrounding temperature, and output.

In general, the reflectance, transmittance and angle characteristics of the optical elements of an optical scanning apparatus, such as a polygon mirror including a light reflector, a scanning lens functioning as an imaging optical system, and an echo mirror changing an optical path, vary with the polarization direction of an input light beam.

For this reason, when a monolithic multi-beam laser element including the surface emitting laser is used as the light source of an optical scanning apparatus, a plurality of beam spots scanned on the surface of a storage medium have different intensities according to the different polarization directions of light emitting points of the beam spots. The difference in the intensity causes non-uniformity in pitch on an image, thus reducing image quality considerably.

SUMMARY OF THE INVENTION

Accordingly, the present invention has been made keeping in mind the above problems occurring in the prior art, and an object of the present invention is to provide a light modulator type multi-beam scanning apparatus using a dichroic slit, in which each of the transmissive portions of the dichroic slit, which corresponds to light of a specific color, is coated with a material capable of transmitting only the light of a specific color so as to filter light of various colors using a single slit.

In order to accomplish the above object, the present invention provides a light modulator type multi-beam scanning apparatus using a dichroic slit, including a first lens unit for converting a plurality of beams of light, which are emitted from a plurality of light sources, into collimated beams, respectively, and outputting the collimated beams; a plurality of light modulators for modulating the collimated beams, which are emitted from the first lens unit, into diffracted beams having a plurality of diffraction orders, respectively; a focusing unit for forming a multi-diffracted beam by focusing the diffracted beams having a plurality of diffraction orders; a second lens unit for separating the multi-diffracted beam, which is focused by the focusing unit, into separate diffracted beams according to diffraction orders; a dichroic slit for selectively transmitting some of the separate diffracted beams having one or more predetermined diffraction orders; and a third lens unit for projecting the some of the separate diffracted beams, which are selectively transmitted by the dichromatic mirror, onto an object.

In addition, the present invention provides a light modulator type multi-beam scanning apparatus using a dichroic slit, including a first lens unit for focusing a plurality of beams of light, which are emitted from a plurality of light sources, into a multi-beam, converting the multi-beam into a multi-collimated beam, and outputting the multi-collimated beam; a light modulator for forming a multi-diffracted beam, which has a plurality of diffraction orders, by performing time-division on the multi-collimated beam and modulating the multi-collimated beam with each component beam of the multi-collimated beam being processed for a corresponding time; a second lens unit for separating the multi-diffracted beam, which is formed by the light modulator and has the plurality of diffraction orders, into separate diffracted beams according to diffraction orders; a dichroic slit having one or more portions, each of the portions of the dichroic slit transmitting light having one or more predetermined diffraction orders with respect to each of wavelengths of the separate beams; and a third lens unit for projecting the light having the predetermined orders, which is emitted from the dichroic slit, onto each of separate regions of an object, respectively.

In addition, the present invention provides a light modulator type multi-beam scanning apparatus using a dichroic slit, including a first lens unit for focusing a plurality of beams of light, which are emitted from a plurality of light sources, into a multi-beam, converting the multi-beam into a multi-collimated beam, and outputting the multi-collimated beam; a light modulator for forming a multi-diffracted beam by performing time-division on the multi-collimated beam, which is emitted from the first lens unit, and modulating the multi-collimated beam with each component beam of the multi-collimated beam being processed for a corresponding time; a second lens unit for separating the multi-diffracted beam, which is formed by the light modulator, into separate diffracted beams according to diffraction orders; a dichroic slit for selectively transmitting some of the separate diffracted beams having one or more predetermined orders; and a dichroic mirror array composed of a plurality of dichroic mirrors, each of the dichroic mirrors projecting one of the separate diffracted beams onto a corresponding object and transmitting a remainder of the separate diffracted beams therethrough.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The construction of a light modulator type multi-beam scanning apparatus using a dichroic slit according to the present invention is described in detail with reference to the accompanying drawings.

Figure 1:
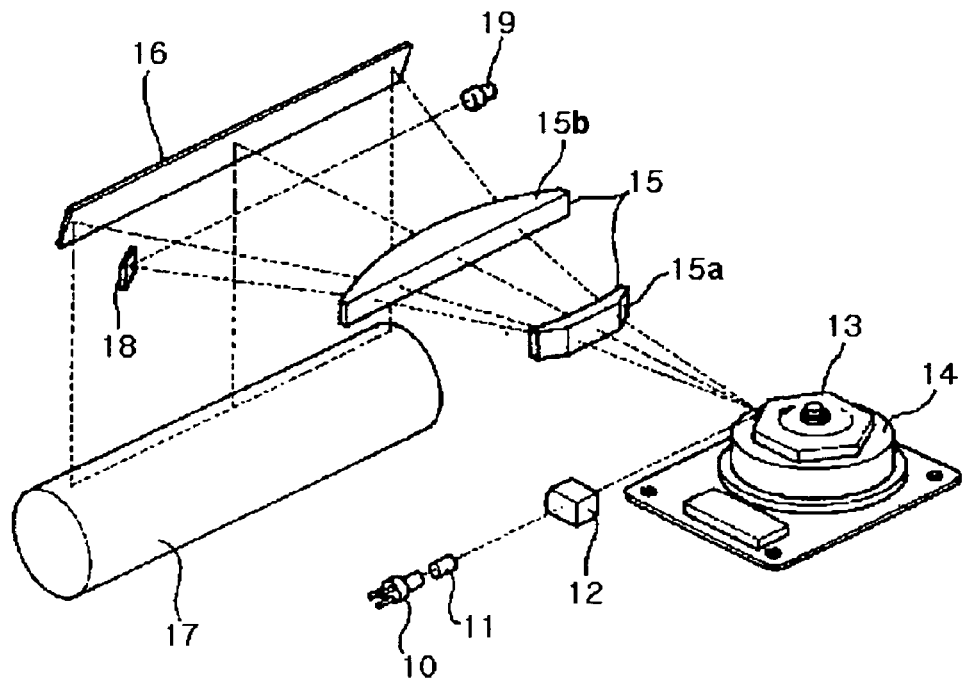
FIG. 1 is a perspective view showing a conventional scanning apparatus using a single light source and an f·θ lens.
Figure 2:
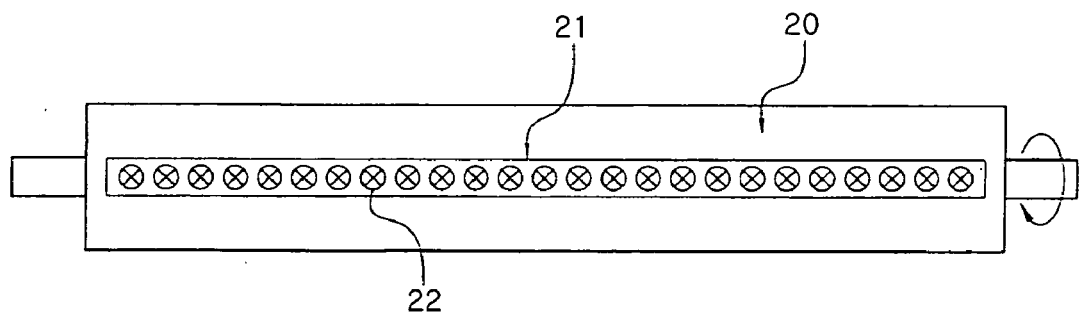
FIG. 2 is a diagram showing a conventional image head printing method for performing laser scanning using a multi-beam formed by an LED array constructed in an image head.
Figure 3:
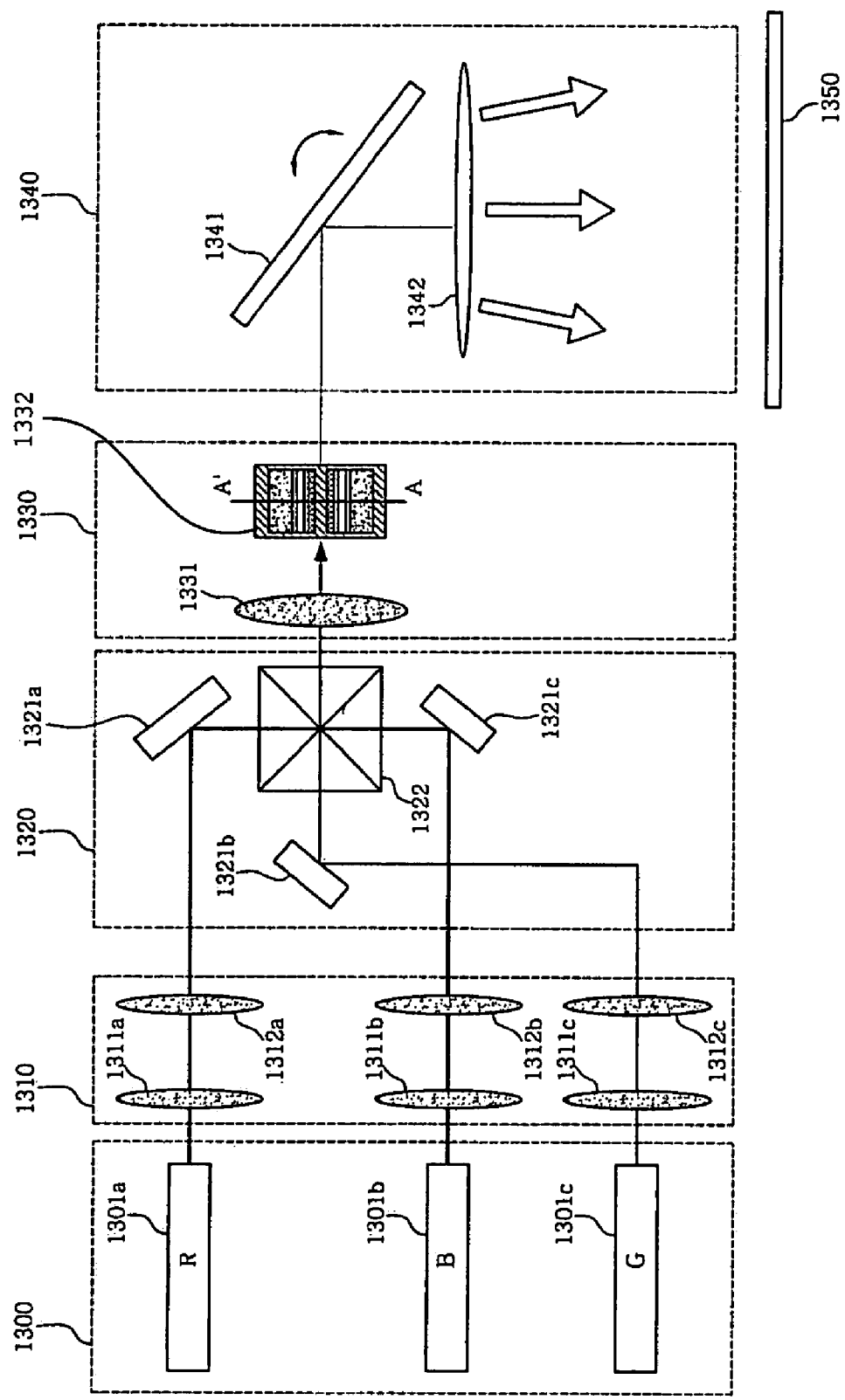
FIG. 3 is a configuration diagram showing a display apparatus using a dichroic slit according to an embodiment of the present invention.

FIG. 3 is a configuration diagram showing a display apparatus using a dichroic slit according to an embodiment of the present invention.

Referring to FIG. 3, the display apparatus using the dichroic slit according to the embodiment of the present invention includes a plurality of light sources 1300, an illumination lens 1310, a combining system 1320, a Fourier filter 1330, a projection system 1340 and a screen 1350.

The plurality of light sources 1300 includes a red light source 1301a, a blue light source 1301b and a green light source 1301c. The illumination lens 1310 converts incident light into collimated light, and includes a plurality of cylinder lenses 1311a to 1311c and a plurality of collimator lenses 1312a to 1312c.

That is, the illumination lens 1310 converts a plurality of beams, which are output from the plurality of light sources 1300, into linear light beams parallel to the direction of an optical path, and focus the linear light beams onto corresponding light modulators 1321a to 1321c, respectively.

The plurality of collimator lenses 1311a to 1311c converts spherical light, which is incident from the plurality of light sources 1300 through the cylinder lenses 1311a to 1311c, into collimated light, and causes the collimated light to be incident on corresponding diffraction light modulators 1321a to 1321c.

The cylinder lenses 1311a to 1311c convert the spherical light into linear light, and cause the linear light to be incident on corresponding diffraction light modulators 1321a to 1321c through the collimator lenses 1312a to 1312c so that a plurality of beams of collimated light incident from the plurality of light sources 1310a to 1310c are caused to be incident on corresponding light modulators 1321a to 1321c, respectively.

The combining system 1320 includes a plurality of diffraction light modulators 1321a to 1321c and a beam splitter 1322. The diffraction light modulators 1321a to 1321c diffract incident light and output diffracted light. The beam splitter 1322 combines a plurality of beams of diffracted light together and outputs combined light.

The diffraction light modulators 1321a to 1321c form a plurality of beams of diffracted light by diffracting the plurality of beams of linear light incident from the illumination lens 1310, and cause the plurality of beams of diffracted light to be combined together through the beam splitter 1322 and to be output to the Fourier filter 1330.

Each of the diffraction light modulators 1321a to 1321c is composed of a plurality of actuating cells 320 having thin or thick film structures. Instead of the diffraction light modulators 1321a to 1321c, transmissive light modulators or reflective light modulators may be used.

Figure 6:
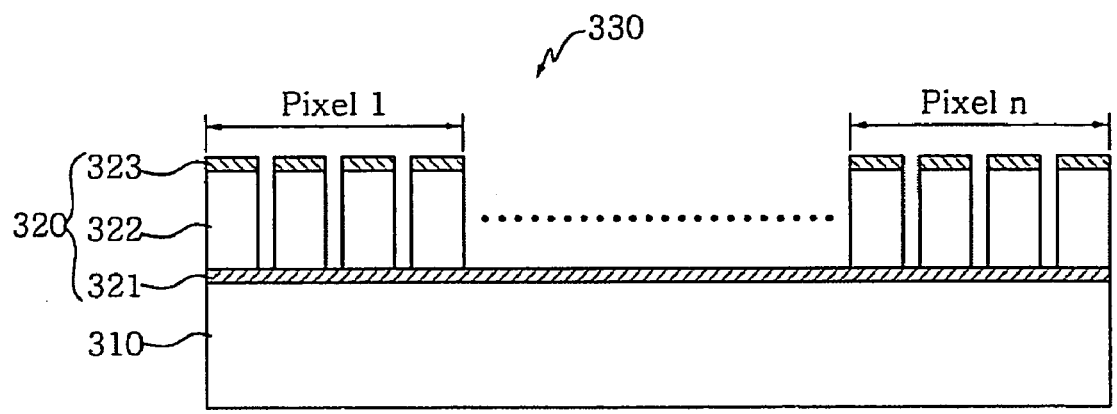
FIG. 6 is a diagram showing a thick film actuating cell array constituting the light modulator of the present invention.

Each of the diffraction light modulators 1321a to 1321c, as shown in FIG. 6, includes actuating cells 320, which are each composed of a lower electrode 321, a piezoelectric/electrostrictive layer 322 and an upper electrode 323 stacked on a silicon substrate 310 having a depression for providing air space at the center of the silicon substrate 310 and are moved laterally by driving power applied from the outside.

Each of the diffraction light modulators 1321a to 1321c is operated by the pixel 330 into which a certain number of actuating cells 320 are grouped. The pixel 330 corresponds to a dot constituting a part of a screen 1350.

Figure 7:
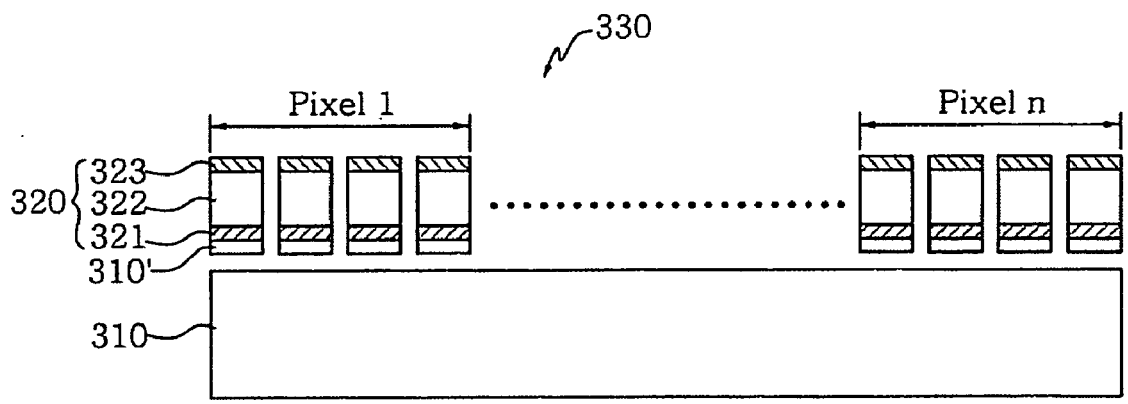
FIG. 7 is a diagram showing a thin film actuating cell array constituting the light modulator of the present invention.

Although in FIG. 7, only the pixel 330 composed of four actuating cells 320 is illustrated, the number of actuating cells 320 constituting the pixel 330 is not limited to four, but may be any number.

The operation of the diffraction light modulator is described with reference to FIGS. 8 and 9.

The actuating cells 320 constituting a pixel 330 of each of the diffraction light modulators 1321a to 1321c act as reflectors for reflecting incident light or as variable diffraction gratings for producing diffracted beam having specific diffraction orders, depending on whether driving power applied from the outside exists.

That is, the diffraction light modulators 1321a to 1321c can generate diffracted beams that can be generated by the diffraction action of the pixels 330 each composed of a predetermined number of actuating cells 320, that is, diffracted beams having 0, +1, −1 and higher diffraction orders. The operation of the actuating cells 320 performed in conjunction with the 1-order diffracted beam is described for ease of description.

Figure 8A:
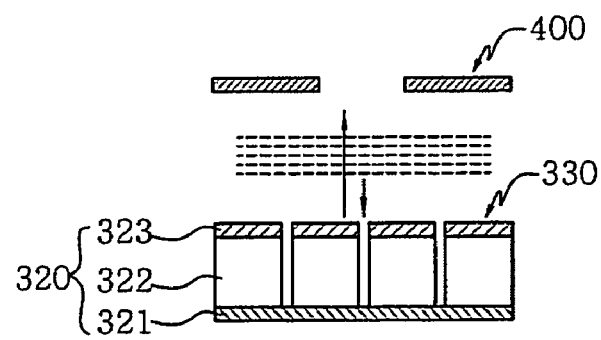
FIGS. 8a to 9b are diagrams showing the operation of actuation cells, which constitute the light modulator, in response to driving power.
Figure 8B:
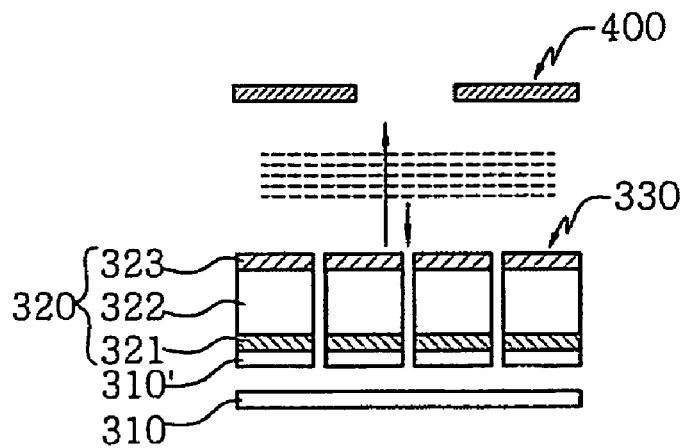

In the case where a single beam is incident in a horizontal direction while no driving power is applied from the outside, each of the pixels 330 constituting the diffraction light modulators 1321a to 1321c does not diffract light because the actuating cells 320 constituting the pixel 330 are even with one another, as shown in FIGS. 8a and 8b. Consequently, the 0-order diffracted beam is generated so that the single beam is reflected in the direction identical to the direction in which the single beam is incident.

FIG. 8a is a diagram illustrating the formation of the 0-order diffracted beam by thick film actuating cells 320 constituting each of the pixels 330. FIG. 8b is a diagram illustrating the formation of the 0-order diffracted beam by thin film actuating cells 320.

In contrast, in the case where driving power is applied from the outside, each of the pixels 330 constituting the diffraction light modulators 1321a to 1321c forms a variable diffraction grating based on the change in the configuration of the actuating cells 320 in which the heights of the actuating cells 320 are increased, reduced or constant. Based on such a change, the pixel 330 diffracts a single beam incident from the outside and forms a beam having a predetermined diffraction order.

Figure 9A:
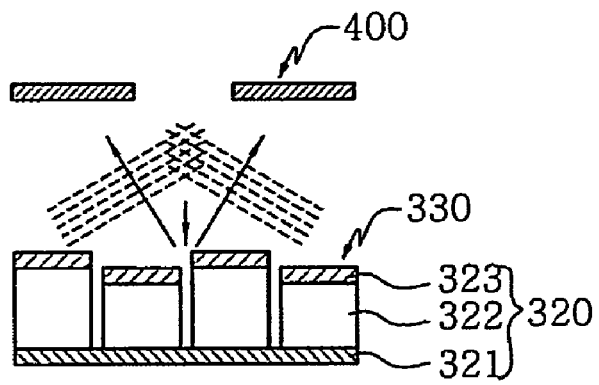
Figure 9B:
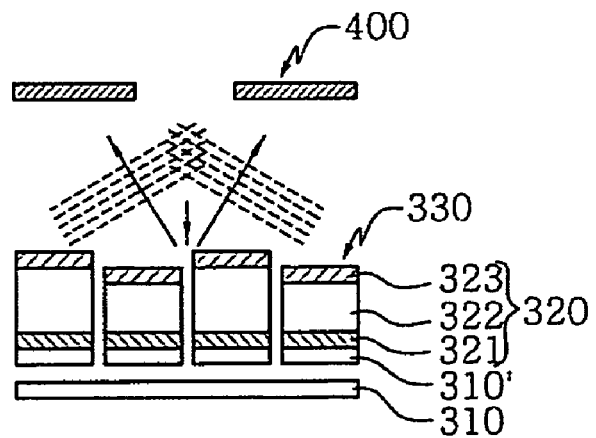

FIG. 9a is a diagram illustrating the formation of the ±1-order diffracted beam by the thick film actuating cells 320 constituting each of the pixels of the diffraction light modulators 1321a to 1321c. FIG. 9b is a diagram illustrating the formation of the ±1-order diffracted beam by the thin film actuating cells 320 constituting each of the pixels of the diffraction light modulators 1321a to 1321c.

In the case where driving power is applied so that the actuating cells 320 constituting each of the pixels 330 form a difference in height that is ¼ of a wavelength, the pixel 330 minimizes 0-order diffraction and maximizes +1 or −1-order diffraction.

That is, in the diffraction mode where the difference in height between neighboring actuating cells 320, that is, the difference in height between reflecting surfaces, forms ¼ of a wavelength, ±1- and higher-order diffracted beams may be formed.

In the meantime, the Fourier filter 1330 includes a projection lens 1331 and a dichroic slit 1332, and transmits only some of the diffracted beams having desired orders. The projection lens 1331 separates incident light into a plurality of beams of light according to diffraction orders, and the dichroic silt 1332 transmits only some of the diffracted beams having desired orders. The dichroic slit 1332 used in this case is illustrated in detail in FIGS. 10a to 10e. That is, the projection lens 1331 is a Fourier lens, and functions to separate incident light into a plurality of beams of light according to diffraction orders. The projection lens 1331 separates the incident light into 0- and ±1-order diffracted beams.

The dichroic slit 1332 receives a multi-diffracted light, which is emitted from the plurality of light sources and formed by the diffraction through the diffraction light modulators 1321a to 1321c, through the projection lens 1331, selectively transmits only some of the multi-diffracted light having one or more desired diffraction orders, and outputs the transmitted light to a projection system 1340.

Figure 10A:
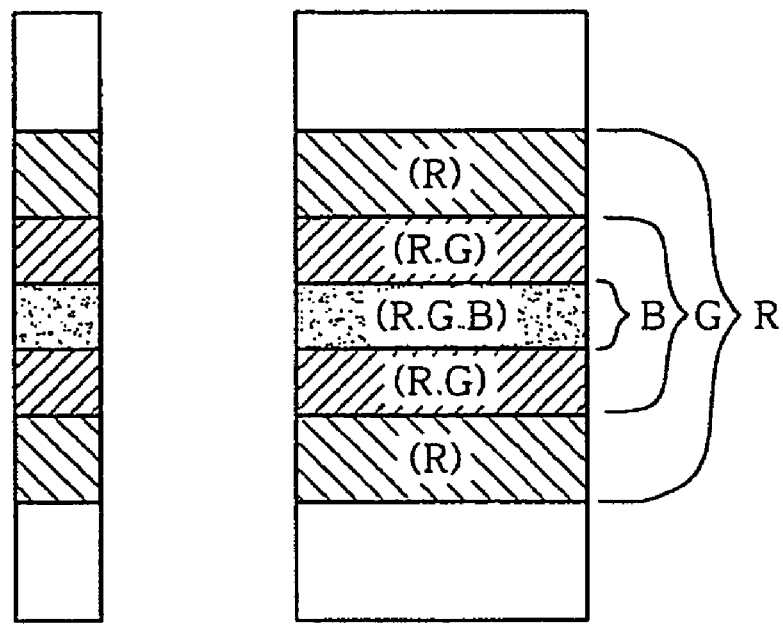
FIG. 10a is side and front views showing a dichroic slit for 0-order diffracted light.

The plan and front views of the dichroic slit 1332 used in that case are shown in FIG. 10a. As shown in FIG. 10a, in the case of a 0-order diffraction slit, region B is coated with a material that can transmit only 0-order diffracted beams of blue, green and red light, the portions of region G that do not overlap the region B are coated with a material that can transmit only 0-order diffracted beams of green and red light, and the portions of region R that do not overlap the regions B and G are coated with a material that can transmit only a 0-order diffracted beam of red light. The remaining portion is coated with a material that does not transmit any beam of blue, green or red light.

Figure 10B:
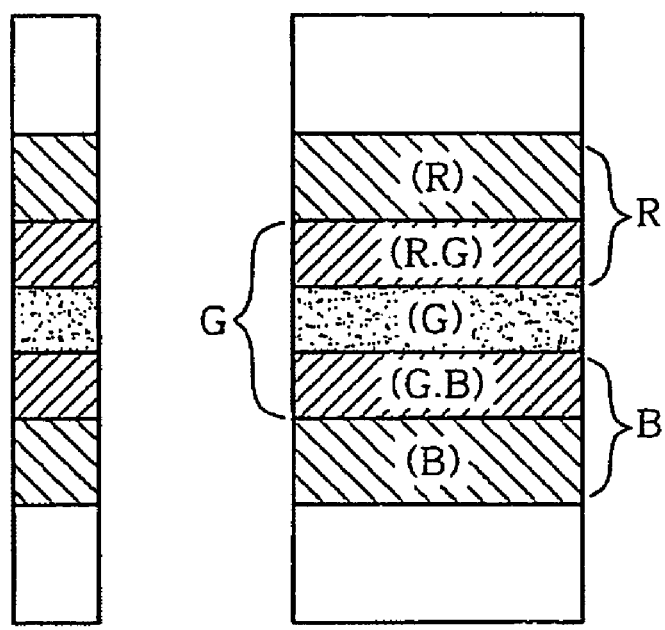
FIGS. 10b and 10c are side and front views showing two dichroic slits for ±1-order diffracted light.

A ±1-order diffraction slit is shown in FIG. 10b. In the case of the ±1-order diffraction slit, the portion of region R that does not overlap region G is coated with a material that can transmit only a beam of red light, the portion where regions R and G overlap each other is coated with a material that can transmit only beams of red and green light, the portion of region R that does not overlap regions R and B is coated with a material that can transmit only a beam of green light, the portion of the region G that overlaps the region B is coated with a material that transmits beams of green and blue color, and the portion of the region B that does not overlap the region B is coated with a material that transmits only a beam of blue light.

Figure 10C:
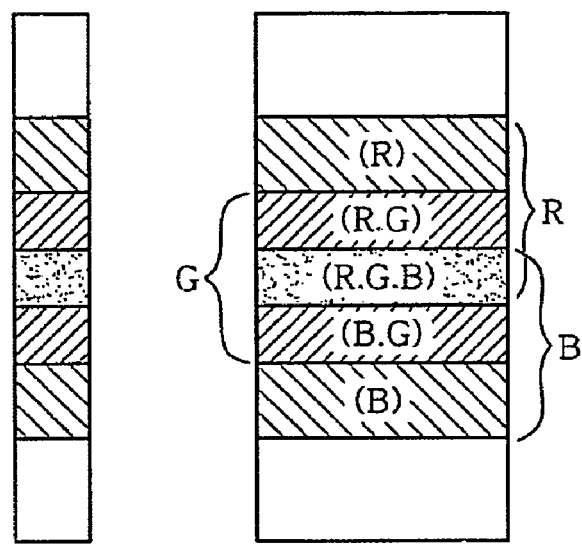

Another ±1-order diffraction slit is shown in FIG. 10c. In the case of the ±1-order diffraction slit, the portion of region R that does not overlap region G is coated with a material that can transmit a beam of red light, the portion where regions R and G overlap each other is coated with a material that can transmit only beams of red and green light, and the portion where regions R, G and B overlap one another is coated with a material that can transmit all the beam of red, green and blue light.

In this case, the region G includes the portion that overlaps the region R, the portion that overlaps the regions R and B, and the portion that overlaps the region B. The region B includes the portion that overlaps both regions G and R, the portion that overlaps only the region G, and the portion that transmits only a beam of blue light.

As described above, when the dichroic slit 1332 is used, beams of a plurality of wavelengths can be filtered out and light can be separated into a plurality of beams according to diffraction orders. A slit interval can be determined using the following Equation 1.

$$D=\lambda/\Lambda *f(\lambda) \quad (1)$$

where D is the slit interval, $\lambda$ is the wavelength of a light source, $\Lambda$ is the period of a diffraction grating, and $f(\lambda)$ is the focal distance of the projection lens 1331 that varies with wavelength. Accordingly, 0- and ±1-order slits have the opposite transmissive and reflective patterns.

Figure 10D:
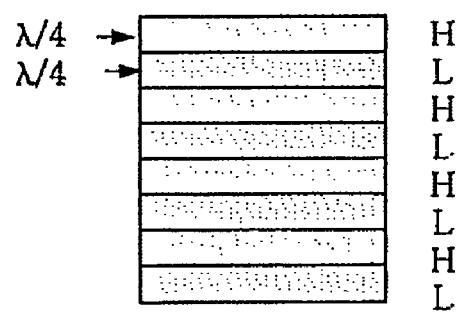
FIG. 10d is a front view showing a dichroic slit having high-transmittance characteristics.
Figure 10E:
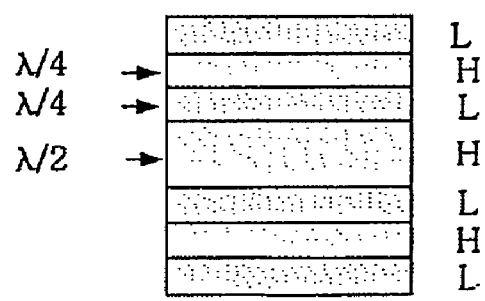
FIG. 10e is a front view showing a dichroic slit having high-reflectance characteristics.

In the meantime, the dichroic slit 1332 may be a high transmittance type or high reflectance mirror type. As shown in FIG. 10d, in the high transmittance mirror type dichroic slit, high transmittance can be achieved by alternately coating two types of media, including a high-refractive index medium and a low-refractive index medium, on top of another to have a thickness of $\lambda/4$. As shown in FIG. 10e, in the high-reflectance type dichroic slit, high transmittance can be achieved by alternately and symmetrically coating two types of media, including a high-refractive index medium and a low-refractive index medium, on top of another to have an optical thickness of $\lambda/4$, with the high-refractive medium being located at the center of the slit to have an optical thickness of $\lambda/2$ and the low-refractive index medium being located at the top and bottom of the slit.

The high-refractive index media include $TiO_2$, ZnO, $Ta_2O_5$, $SrTiO_3$, $HfO_2$, $CeO_2$ and ZnS. ZnS is chiefly used as the high-refractive index medium. The refractive index of the media is about 2.3 to 2.4. The low-refractive index media include $SiO_2$, $MgF_2$, NaF, LiF, $CaF_2$, $AlF_3$ and Cryolite $\{AlF_3(NaF)_3\}$. $MgF_2$ is chiefly used as the low-refractive index medium.

The projection system 1340 projects the incident diffracted light onto the screen 1350. The projection system 1340 performs a function of forming spots by focusing the diffracted beam, which is incident through the dichroic slit 1332 and has the predetermined diffraction order, on the screen 1350. In particular, the projection system 1340 is a projection lens.

Referring to FIG. 3, the operation of the display apparatus using the dichroic slit according to the present invention is described in detail.

A plurality of spherical beams generated by the plurality of light sources 1300, particularly a plurality of LDs, are incident on the illumination lens 1310 that include the plurality of cylinder lenses 1311a to 1311c and the plurality of collimator lenses 1312a to 1312c that are arranged on optical axes.

In this case, the plurality of cylinder lenses 1311a to 1311c constituting parts of the illumination lens 1310 convert the beams, emitted from the plurality of light sources 1300a to 1300c, into linear beams so as to cause the beams to be incident on the diffraction light modulators 1311a to 1311c parallel to the diffraction light modulators 1311a to 1311c.

The collimator lenses 1312a to 1312c convert the linear light into collimated light and cause the collimated light to be incident on the diffraction light modulators 1321a to 1321c.

After the linear light is converted into collimated light through the illumination lens 1310 as described above, the diffraction light modulators 1321a to 1321c use the pixels 330, composed of the actuating cells 320, as reflectors or variable refracting gratings for forming diffracted beams having 0-, +1- and −1-diffraction orders based on the difference in the height of the actuating cells 320, depending on whether driving power is applied or not.

The plurality of diffracted beams, which are formed by the plurality of diffraction light modulators 1321a to 1321c and have predetermined diffraction orders as described above, are combined together and multiplexed by the beam splitter 1322, and then a multi-diffracted beam is incident on the Fourier filter 1330.

The projection lens 1331 of the Fourier filter 1330 separates the multi-diffracted beam into beams according to diffraction orders, and projects the separate beams to the dichroic slit 1332. In the case where the beams are incident on the dichroic slit 1332 through the projection lens 1331, the dichroic slit 1332 transmits only beams having predetermined diffraction orders and filters out diffracted beams having the other diffraction orders.

In the case of using diffracted light having a 0-diffraction order, the dichroic slit 1332 transmits only beams having the 0-diffraction order and filters out diffracted beams having +1- and −1-diffraction orders.

As a result, the dichroic slit 1332 does not filter out and transmits diffracted beams having the 0-diffraction order, thus forming spots on a screen 1350 using the 0-order diffracted beams.

Figure 4:
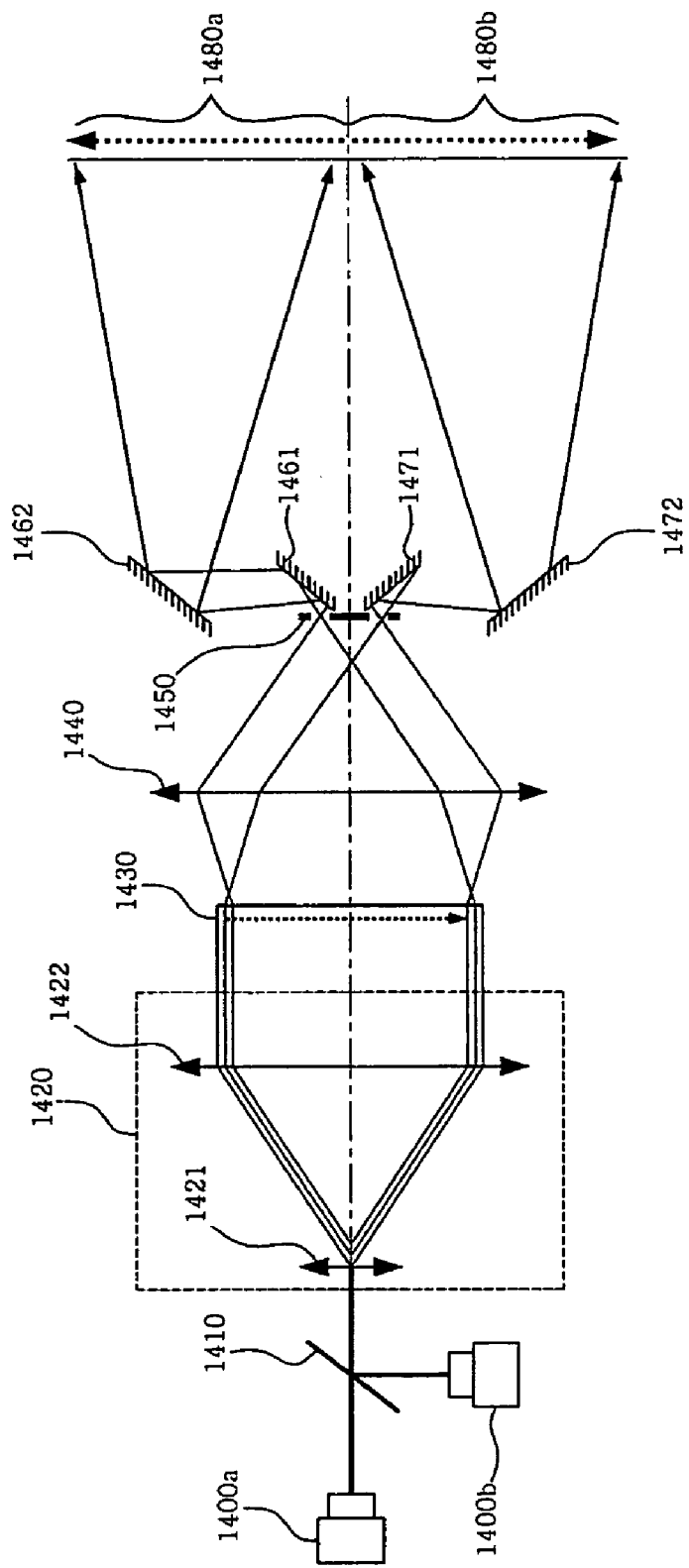
FIG. 4 is a sectional configuration diagram showing a diffractive multi-beam scanning apparatus according to a second embodiment of the present invention.

FIG. 4 is a sectional view showing a multi-diffracted beam scanning apparatus using a dichroic slit in accordance with a second embodiment of the present invention.

Referring to FIG. 4, the multi-diffracted beam scanning apparatus using a dichroic slit includes a plurality of light sources 1400a and 1400b, a dichroic mirror 1410, an illumination lens 1420, a light modulator 1430, a projection lens 1440, a dichroic slit 1450, dichroic mirrors 1461 and 1471, reflecting mirrors 1462 and 1472, and objects 1480a and 1480b.

The plurality of light sources 1400a and 1400b includes two light sources in FIG. 4, and functions to emit two beams of light of different wavelengths. The dichroic mirror 1410 has a characteristic of reflecting light of a specific wavelength and transmitting light of another wavelength and, therefore, performs a function of combining the two beams of light together. Consequently, with the dichroic mirror 1410, beams of light of different wavelengths incident from the plurality of light sources 1400a and 1400b can be combined together. In this case, in the present invention, time-divided beams of light are formed by the sequential operation of the plurality of light sources 1400a and 1400b. That is, the first light source 1400a generates and emits light for a specific time, the second light source 1400b generates and emits light for a specific time thereafter, and so on, thus emitting time-divided beams of light of different wavelengths.

The illumination lens 1420 converts diffusing light into collimated light and emits the collimated light onto the light modulator 1430. The illumination lens 1420 includes a cylinder lens 1421 and a collimator lens 1422. The light modulator 1430 forms diffracted light by diffracting incident light, and emits the diffracted light.

The projection lens 1440 emits 0-, +1- and −1-order diffracted light while separating 0-, +1 and −1-order diffracted light from one another. The dichroic slit 1450 selectively transmits and reflects incident light of desired wavelengths.

In FIG. 4, the upper portion of the dichroic slit 1450 transmits only +1-order light formed by the first of the plurality of beams (for the time for which the light source 1400a of the first beam generates and emits light), and the lower portion of the dichroic slit 1450 transmits only −1-order light formed by the second of the plurality of beams (for the time for which the light source 1400a of the second beam generates and emits light).

The dichroic slit 1450 is the same as described in conjunction with FIGS. 10a to 10e. The dichroic mirrors 1461 and 1471 and the reflecting mirrors 1462 and 1472 function to cause diffracted light to be incident on the desired objects 1480a and 1480b.

The dichroic mirror 1461 and the reflecting mirror 1462 existing on the upper part of FIG. 4 cause diffracted light to be incident on the upper one of the objects 1480a and 1480b. The dichroic mirror 1471 and the reflecting mirror 1462 existing on the lower part of FIG. 4 cause diffracted light to be incident on the lower one of the objects 1480a and 1480b.

Figure 5:
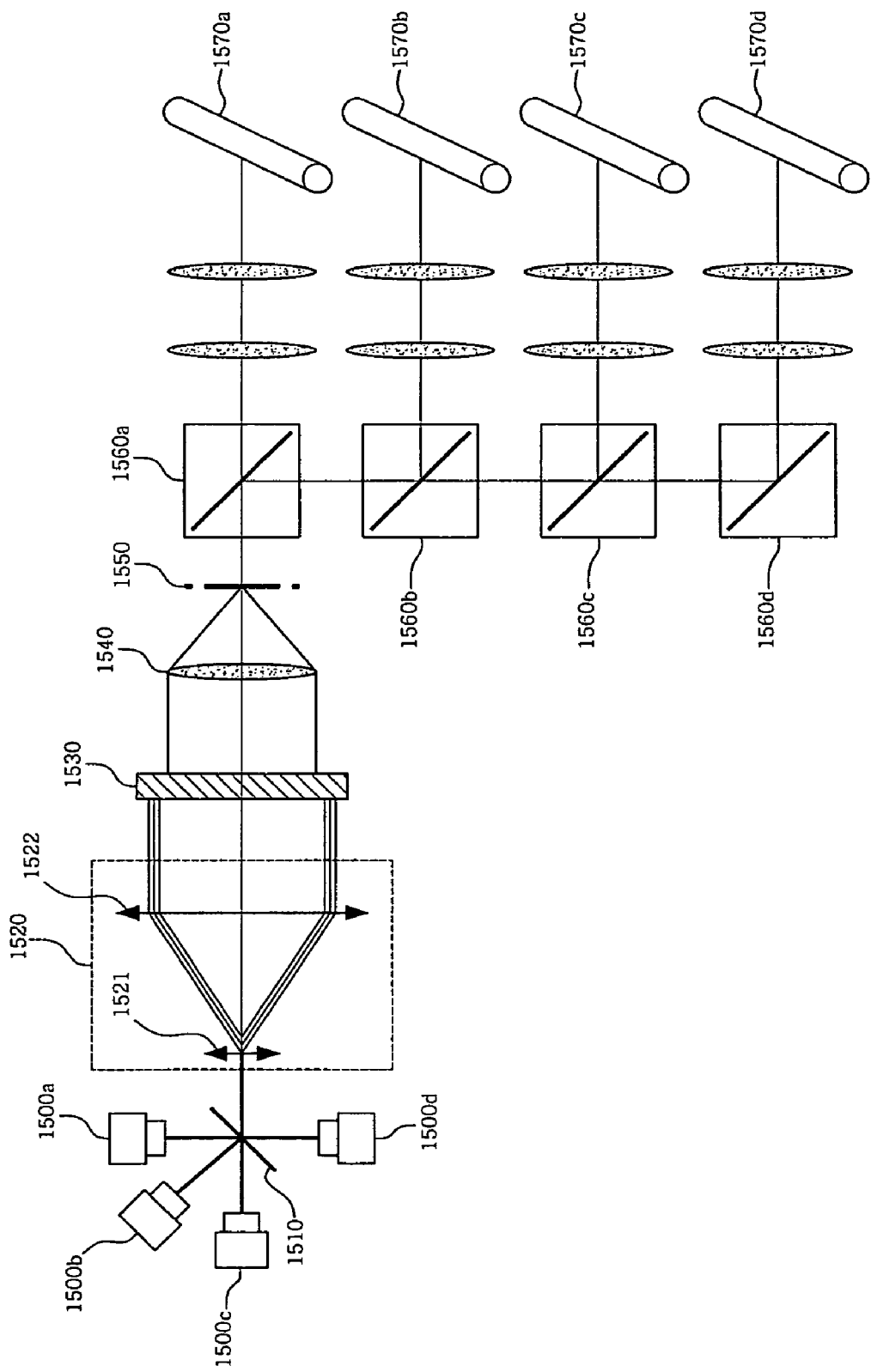
FIG. 5 is a sectional configuration diagram showing a diffractive multi-beam scanning apparatus according to a third embodiment of the present invention.

FIG. 5 is a diagram showing a multi-diffracted beam printing apparatus using a dichroic slit in accordance with a third embodiment of the present invention.

Referring to FIG. 5, the multi-diffracted beam printing apparatus using a dichroic slit includes a plurality of light sources 1500a to 1500d, a front dichroic mirror 1510, an illumination lens 1520, a light modulator 1530, a projection lens 1540, a dichroic slit 1550, rear dichroic mirrors 1560a to 1560d, and a plurality of drums 1570a to 1570d.

The plurality of light sources 1500a to 1500d generate and emit light of different wavelengths. The front dichroic mirror 1510 combines incident light of different wavelengths together and emits combined light. In this case, the plurality of light sources 1500a to 1500d are operated in a time division fashion, so that light is transmitted through the dichroic mirror 1510 while remaining time-divided. That is, the light is transmitted through the front dichroic mirror 1510 in such a way that the light generated by the first light source 1500a is transmitted for a first specific time, the light generated by the second light source 1500b is transmitted for a second specific time, the light generated by the third light source 1500c is transmitted for a third specific time, and the light generated by the fourth light source 1500d is transmitted for a fourth specific time.

The illumination lens 1520 converts incident light into collimated light and emits the collimated light. The illumination lens 1520 includes a cylinder lens 1521 and a collimator lens 1522. The light modulator 1530 converts incident light into diffracted light and emits the diffracted light. The projection lens 1540 separates diffracted light according to diffraction orders.

The dichroic slit 1550 selectively transmits 0-order one, +1-order one and −1-order one of incident diffracted beams. The rear dichroic mirrors 1560a to 1560d selectively transmit and reflect light.

In more detail, the first one 1560a of the rear dichroic mirrors 1560a to 1560d reflects one of the incident beams to the first drum 1570a, and transmits the other beams.

The second one 1560b of the rear dichroic mirrors 1560a to 1560d reflects one of the incident beams to the second drum 1570b, and transmits the other beams.

The third one 1560c of the rear dichroic mirrors 1560a to 1560d reflects one of the incident beams to the third drum 1570c, and transmits the other beams.

The fourth one 1560d of the rear dichroic mirrors 1560a to 1560d reflects one of the incident beams to the fourth drum 1570d, and transmits the other beams.

Although in the drawings, the scanning apparatus of the present invention has been illustrated as being applied only to the drums of the printer and the display apparatus, the application of the present invention is not limited to these apparatuses, but the scanning apparatus of the present invention can be applied to various photoelectric apparatuses, such as an electronic photocopier and a word processor.

When the dichroic slit according to the present invention is employed, a simple optical system can be constructed, so that color images can be implemented using the simple optical system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light modulator type multi-beam scanning apparatus using a dichroic slit, comprising:

a first lens unit for converting a plurality of beams of light, which are emitted from a plurality of light sources, into collimated beams, respectively, and outputting the collimated beams;

a plurality of light modulators for modulating the collimated beams, which are emitted from the first lens unit, into diffracted beams having a plurality of diffraction orders, respectively;

a focusing unit for forming a multi-diffracted beam by focusing the diffracted beams having a plurality of diffraction orders;

a second lens unit for separating the multi-diffracted beam, which is focused by the focusing unit, into separate diffracted beams according to diffraction orders;

a dichroic slit for selectively transmitting some of the separate diffracted beams having one or more predetermined diffraction orders; and a third lens unit for projecting the some of the separate diffracted beams, which are selectively transmitted by the dichromatic mirror, onto an object.

2. The light modulator type multi-beam scanning apparatus as set forth in claim 1, wherein the focusing unit is a beam splitter.

3. The light modulator type multi-beam scanning apparatus as set forth in claim 1, wherein portions of the dichroic slit, which correspond to the separate diffracted beams having the predetermined diffraction orders, respectively, are coated with transmissive materials, respectively.

4. The light modulator type multi-beam scanning apparatus as set forth in claim 1, wherein a remainder of the dichroic slit other than portions, which correspond to the separate diffracted beams having the predetermined diffraction orders, respectively, is coated with a reflective material.

5. The light modulator type multi-beam scanning apparatus as set forth in claim 1, wherein the light modulator is a diffraction light modulator.

6. A light modulator type multi-beam scanning apparatus using a dichroic slit, comprising:

a first lens unit for focusing a plurality of beams of light, which are emitted from a plurality of light sources, into a multi-beam, converting the multi-beam into a multi-collimated beam, and outputting the multi-collimated beam;

a light modulator for forming a multi-diffracted beam, which has a plurality of diffraction orders, by performing time-division on the multi-collimated beam and modulating the multi-collimated beam with each component beam of the multi-collimated beam being processed for a corresponding time;

a second lens unit for separating the multi-diffracted beam, which is formed by the light modulator and has the plurality of diffraction orders, into separate diffracted beams according to diffraction orders;

a dichroic slit having one or more portions, each of the portions of the dichroic slit transmitting light having one or more predetermined diffraction orders with respect to each of wavelengths of the separate beams; and a third lens unit for projecting the light having the predetermined orders, which is emitted from the dichroic slit, on each of separate regions of an object, respectively.

7. The light modulator type multi-beam scanning apparatus as set forth in claim 6, wherein the portions of the dichroic slit, which correspond to the light having predetermined diffraction orders, respectively, are coated with transmissive materials, respectively.

8. The light modulator type multi-beam scanning apparatus as set forth in claim 6, wherein a remainder of the dichroic slit other than portions, which correspond to the separate diffracted beams having the predetermined diffraction orders, is coated with a reflective material.

9. The light modulator type multi-beam scanning apparatus as set forth in claim 6, wherein the light modulator is a diffraction light modulator.

10. A light modulator type multi-beam scanning apparatus using a dichroic slit, comprising:

a first lens unit for focusing a plurality of beams of light, which are emitted from a plurality of light sources, into a multi-beam, converting the multi-beam into a multi-collimated beam, and outputting the multi-collimated beam;

a light modulator for forming a multi-diffracted beam by performing time-division on the multi-collimated beam, which is emitted from the first lens unit, and modulating the multi-collimated beam with each component beam of the multi-collimated beam being processed for a corresponding time;

a second lens unit for separating the multi-diffracted beam, which is formed by the light modulator, into separate diffracted beams according to diffraction orders;

a dichroic slit for selectively transmitting some of the separate diffracted beams having one or more predetermined orders; and a dichroic mirror array composed of a plurality of dichroic mirrors, each of the dichroic mirrors projecting one of the separate diffracted beams onto a corresponding object and transmitting a remainder of the separate diffracted beams therethrough.

11. The light modulator type multi-beam scanning apparatus as set forth in claim 10, wherein portions of the dichroic slit, which correspond to light having the predetermined diffraction orders, respectively, are coated with transmissive materials, respectively.

12. The light modulator type multi-beam scanning apparatus as set forth in claim 10, wherein a remainder of the dichroic slit other than portions, which correspond to the separate diffracted beams having the predetermined diffraction orders, respectively, is coated with a reflective material.

13. The light modulator type multi-beam scanning apparatus as set forth in claim 10, wherein the light modulator is a diffraction light modulator.

* * * * *